(12) United States Patent
Bostick, III

(10) Patent No.: US 8,848,485 B2
(45) Date of Patent: Sep. 30, 2014

(54) SONIC/ACOUSTIC MONITORING USING OPTICAL DISTRIBUTED ACOUSTIC SENSING

(75) Inventor: Francis X. Bostick, III, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 409 days.

(21) Appl. No.: 13/106,642

(22) Filed: May 12, 2011

(65) Prior Publication Data

US 2011/0280103 A1 Nov. 17, 2011

Related U.S. Application Data

(60) Provisional application No. 61/334,044, filed on May 12, 2010.

(51) Int. Cl.
| | | |
|---|---|---|
| *G01V 1/52* | (2006.01) | |
| *G01V 1/16* | (2006.01) | |
| *G01H 9/00* | (2006.01) | |
| *E21B 47/10* | (2012.01) | |
| *E21B 47/12* | (2012.01) | |
| *G01V 1/46* | (2006.01) | |

(52) U.S. Cl.
CPC .............. *G01H 9/004* (2013.01); *G01V 1/52* (2013.01); *E21B 47/101* (2013.01); *E21B 47/123* (2013.01); *G01V 1/46* (2013.01); *G01V 1/16* (2013.01)
USPC ................ 367/35; 181/108; 181/102; 367/86

(58) Field of Classification Search
CPC ........ G01H 9/004; E21B 47/101; G01V 1/52; G01V 1/46; G01V 1/16
USPC .......... 73/152.47; 181/102, 103, 105; 367/86, 367/35
See application file for complete search history.

(56) References Cited

U.S. PATENT DOCUMENTS

| | | | |
|---|---|---|---|
| 6,321,838 B1 * | 11/2001 | Skinner .................... | 166/250.01 |
| 6,601,671 B1 * | 8/2003 | Zhao et al. ................ | 181/108 |
| 6,712,141 B1 * | 3/2004 | Bussear et al. ........... | 166/250.17 |
| 8,020,436 B2 * | 9/2011 | Bostick, III .............. | 73/152.16 |
| 2002/0119271 A1 * | 8/2002 | Quigley et al. ............ | 428/36.9 |
| 2007/0062696 A1 | 3/2007 | Wilson et al. | |
| 2010/0107754 A1 | 5/2010 | Hartog et al. | |

FOREIGN PATENT DOCUMENTS

GB 2404938 A 2/2005

OTHER PUBLICATIONS

European Search Report, Sep. 9, 2011, European Patent Application No. EP 11250525.

* cited by examiner

*Primary Examiner* — Luke Ratcliffe
*Assistant Examiner* — Hovhannes Baghdasaryan
(74) *Attorney, Agent, or Firm* — Patterson & Sheridan, LLP

(57) ABSTRACT

Methods and apparatus for performing sonic well logging within a wellbore based on optical Distributed Acoustic Sensing (DAS) are provided. A sonic well logging system based on DAS may be capable of producing the functional equivalent of tens, hundreds, or even thousands of acoustic sensors. In this manner, the emplacement of the sonic well logging system based on DAS may not be nearly as complex or expensive as emplacing a sonic well logging system based on traditional methods. Furthermore, multiplexing may be simpler, downhole electronics need not be used, and the sonic well logging system may be used in extreme, high temperature environments.

18 Claims, 10 Drawing Sheets

SONIC/ACOUSTIC MONITORING USING OPTICAL DISTRIBUTED ACOUSTIC SENSING

CROSS-REFERENCE TO RELATED APPLICATIONS

This application claims benefit of U.S. Provisional Patent Application Ser. No. 61/334,044, filed May 12, 2010, which is herein incorporated by reference.

BACKGROUND OF THE INVENTION

1. Field of the Invention

Embodiments of the invention generally relate to methods and apparatus for use in oil and gas wellbores and, more particularly, to performing sonic well logging within such wellbores.

2. Description of the Related Art

Downhole logging tools may be used to temporarily measure many important downhole properties and conditions in oil and gas wells. These tools may be typically classified in two categories: open hole and cased hole. Open hole tools may be designed to measure rock properties in the formations surrounding non-cased wellbores, as well as the properties of the fluids contained in the rocks. Cased hole tools may be designed to measure fluid properties within a cased borehole and also to examine the condition of wellbore components, such as well tubing or casing. Cased hole tools may, in some cases, also measure rock and fluid properties through the well casing.

Formation properties that may be important in producing or storing fluids in downhole reservoirs comprise pressure, temperature, porosity, permeability, density, mineral content, electrical conductivity, and bed thickness. Fluid properties, such as pressure, temperature, density, viscosity, chemical elements, and the content of oil, water, and/or gas, may also be important measurements. Downhole properties may be measured by a variety of sensing systems in these downhole tools, including acoustic, electrical, mechanical, magnetic, electro-magnetic, strain, nuclear, and optical based devices.

Downhole logging tools based on sonic well logging systems may be used to measure downhole properties such as formation porosity, location of bed boundaries and fluid interfaces, well casing condition, and behind casing cement location and bonding quality.

Permanent or semi-permanent monitoring of downhole properties and conditions may be related to the temporary measurements made with downhole logging tools. However, the measurements may involve the long-term emplacement of the sensing systems. Monitoring downhole formation properties over time may have significant value in better producing, injecting, and storing reservoir fluids. Permanent or semi-permanent in-well sensing systems commercially available today may measure borehole pressure, temperature, flow and phase fraction, vibration, seismic response, and micro-seismicity. Other concepts and prototypes exist for permanently or semi-permanently emplaced formation evaluation tools utilizing technologies such as resistivity, acoustics, electric potential, and nuclear radioactivity.

Sonic well logging systems typically require an acoustic energy source and an array of one or more acoustic sensors or receivers. The sensor arrays may consist of multiple discrete devices, and the deployment of an array of sensors may be complex and expensive. Permanently (or semi-permanently) deployed sensors must be able to withstand the downhole environment for long periods of time. In some cases, the downhole temperatures may be very high.

The deployment of a multi-sensor acoustic array currently requires the use of multiple electrical conductors conveyed from the surface to the downhole sensors, sophisticated downhole electronics, or optically multiplexed sensors. Optically multiplexed sensor arrays have been deployed, based on Bragg gratings, for seismic imaging and monitoring and for sonar acoustic based flowmeters. Similar techniques using optical Bragg gratings may also be used to deploy an array of acoustic sensors for permanent or semi-permanent sonic well logging.

SUMMARY OF THE INVENTION

Embodiments of the present invention generally relate to sonic well logging using distributed acoustic sensing (DAS) device.

One embodiment of the present invention provides an apparatus for performing sonic well logging in a wellbore. The apparatus generally includes an acoustic energy source for generating acoustic signals in the wellbore, wherein the acoustic signals interact with the wellbore, a wellbore completion, and/or formations adjacent the wellbore to form transmitted, reflected, refracted, and/or absorbed acoustic signals, and an optical waveguide for DAS disposed in the wellbore, wherein the generated, reflected, or refracted acoustic signals affect light propagating in the waveguide.

Another embodiment of the present invention provides a method. The method generally includes providing an acoustic energy source in a wellbore, providing an optical waveguide in the wellbore, and performing DAS in the wellbore using the acoustic energy source and the optical waveguide.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide methods and apparatus for performing sonic well logging within a wellbore based on optical Distributed Acoustic Sensing (DAS). A sonic well logging system may be used to measure downhole properties such as formation porosity, location of bed boundaries and fluid interfaces, well casing condition, and behind casing cement location and bonding quality. A sonic well logging system based on DAS may be capable of producing the functional equivalent of tens, hundreds, or even thousands of acoustic sensors, wherein the permanent or semi-permanent emplacement of the sonic well logging system based on DAS may not be nearly as complex or expensive as emplacing a sonic well logging system based on traditional methods. Furthermore, multiplexing may be simpler, downhole electronics need not be used, and the sonic well logging system may be used in extreme, high temperature environments.

As used herein, the phrase "permanently emplaced" generally refers to being disposed without the intent to remove and in the case of oil and gas wells, may mean being disposed for the life of the well or even longer (e.g., after the well has been plugged). However, being permanently emplaced does not necessarily mean being disposed forevermore (i.e., for all time) or irremovably disposed. As used herein, the phrase "semi-permanently emplaced" generally refers to being disposed with the intent to remove and in the case of oil and gas wells, may mean being disposed for days, weeks, months, or years.

Figure 1:
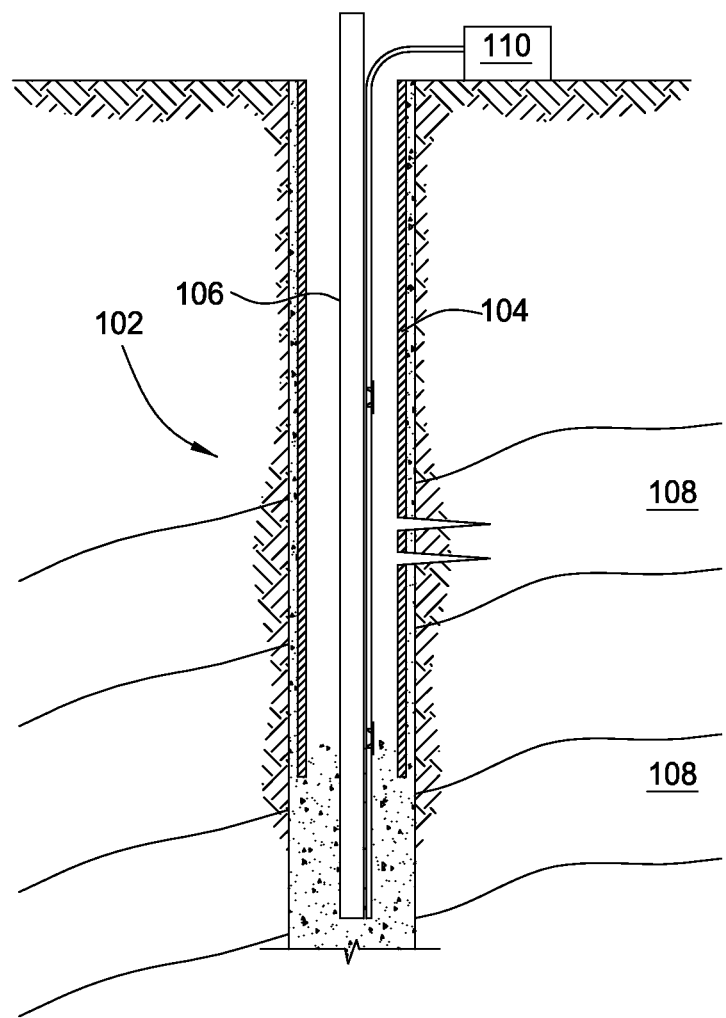
FIG. 1 is a schematic cross-sectional view of a wellbore according to an embodiment of the present invention.

FIG. 1 illustrates a schematic cross-sectional view of a wellbore 102, wherein a sonic well logging system 110 based on DAS may be used to perform sonic well logging. At least a portion of the sonic well logging system 110 may be permanently or semi-permanently emplaced for some embodiments. Properties of the wellbore 102, a wellbore completion (e.g., casing, cement, production tubing, packers), and/or downhole formations surrounding or otherwise adjacent the wellbore 102 may be monitored over time based on the sonic well logging. Further, hydrocarbon production may be controlled, or reservoirs 108 may be managed, based on these monitored properties.

The wellbore 102 may have a casing 104 disposed within, through which production tubing 106 may be deployed as part of a wellbore completion. An acoustic energy source may generate and emit acoustic signals downhole. The acoustic signals may interact with the wellbore 102, the wellbore completion, and/or various downhole formations adjacent the wellbore, leading to transmitted, reflected, refracted, and/or absorbed acoustic signals. An optical waveguide, such as an optical fiber, within the wellbore 102 may function as a DAS device, measuring disturbances in scattered light that may be propagated within the waveguide (e.g., within the core of an optical fiber). The disturbances in the scattered light may be due to the transmitted, reflected, and/or refracted acoustic signals, wherein these acoustic signals may change the index of refraction of the waveguide or mechanically deform the waveguide such that the optical propagation time or distance, respectively, changes. For some embodiments, if the generated acoustic signals are measured at or near the acoustic source (or at some given point), as well as some distance away from the source, then the absorbed energy may also be understood and provide useful information.

The system 110 may have a spatial resolution of one meter along the DAS device, depending on the pulse width of the acoustic source. Therefore, the DAS device may be capable of producing the functional equivalent of tens, hundreds, or even thousands of acoustic sensors along the waveguide, wherein acoustic sensors and/or their functional DAS equivalents may be used for the sonic logging system 110 in addition to the acoustic energy source. The bandwidth of the signal that may be measured is typically within the acoustic range (i.e., 20 Hz-20 kHz), but a DAS device may be capable of sensing in the sub-acoustic (i.e., <20 Hz) and ultrasound (i.e., >20 kHz) ranges. For some embodiments, the sonic well logging system 110 may utilize a single fiber within a suspended cable deployed in production tubing 106, in a cable coupled to the outside of the production tubing 106, or in a cable behind a well casing 104, as will be described further below.

Figure 2:
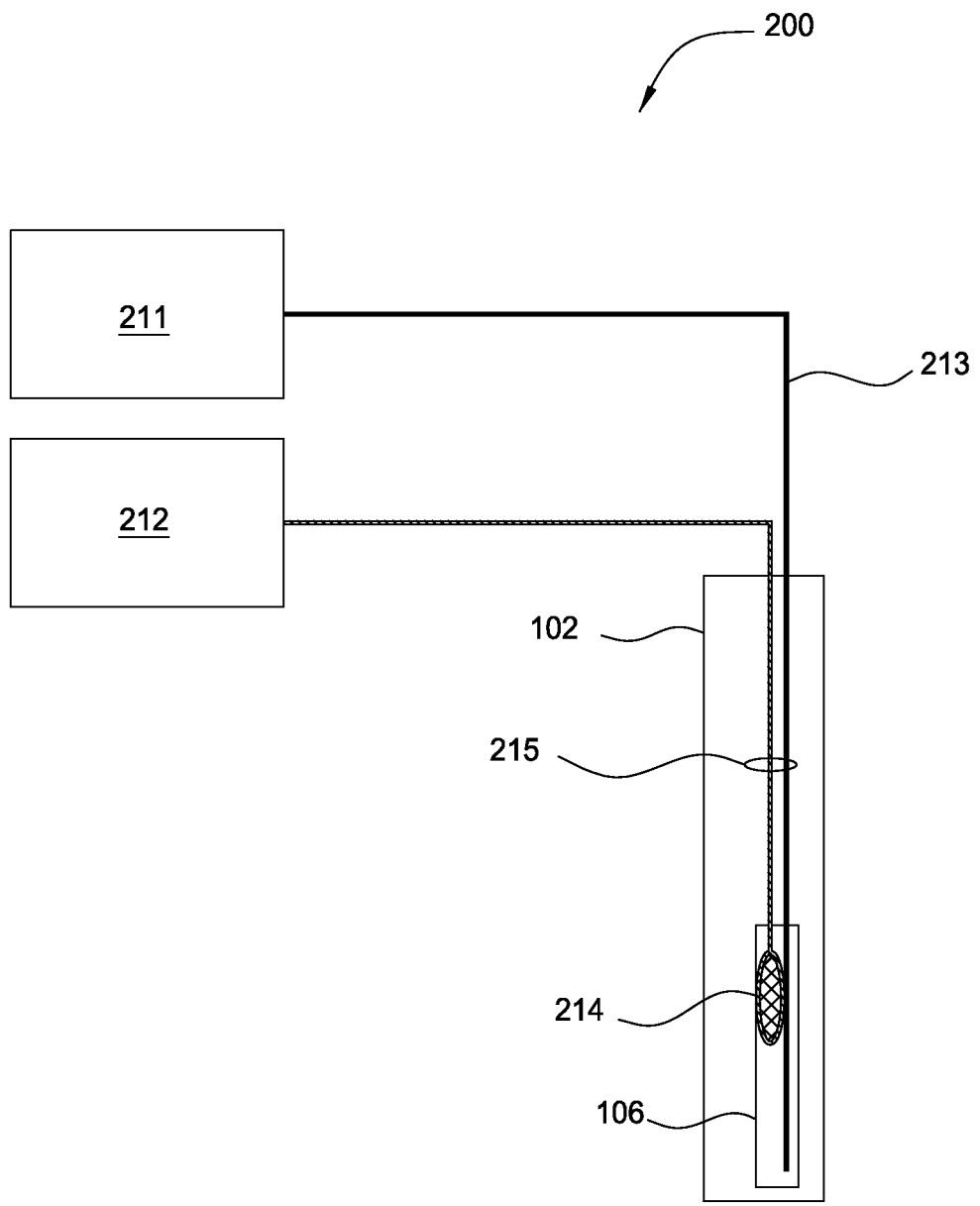
FIG. 2 illustrates a sonic well logging system, a portion of which may be permanently or semi-permanently emplaced, using an acoustic energy source and a distributed acoustic sensing (DAS) device both suspended in a cable, according to an embodiment of the present invention.

FIG. 2 illustrates an embodiment of a sonic well logging system 200, a portion of which may be permanently or semi-permanently emplaced for some embodiments, comprising an acoustic energy source 214 and a distributed acoustic sensing (DAS) device 213 both suspended in a cable 215 within the wellbore 102, such as within the production tubing 106, as shown. The sonic well logging system 200 may function as an open hole tool, wherein the wellbore 102 may not have the casing 104 or the tubing 106. Open hole tools may be designed to measure rock properties in the formations surrounding non-cased wellbores, as well as the properties of the fluids contained in the rocks.

The acoustic energy source 214 may be controlled by an acoustic energy source controller 212, typically disposed at the surface. For example, the controller 212 may transmit electrical pulses in an effort to stimulate piezoelectric elements in the acoustic energy source 214, thereby generating the acoustic signals. The controller 212 may manage the pulse width and/or duty cycle of such electrical pulses.

A DAS instrument 211 may introduce an optical pulse, using a pulsed laser, for example, into the DAS device 213. The DAS instrument 211 may also sense the disturbances in the light propagating through the DAS device 213. The DAS instrument 211 may comprise a Silixa IDAS™ instrument, for example. The DAS instrument 211 may send an optical signal into the DAS device 213 and may look at the naturally occurring reflections that are scattered back all along the DAS device 213. By analyzing these reflections and measuring the time between the optical signal being launched and the signal being received, the DAS instrument 211 may be able to measure the effect of the acoustic reflections on the optical signal at all points along the waveguide, limited only by the spatial resolution. Therefore, downhole electronics may not be required for the sonic well logging system 200 based on DAS.

A sonic well logging system may also function as a cased hole tool, wherein the wellbore 102 may have the casing 104. Cased hole tools may be designed to measure fluid properties within a cased borehole and also to examine the condition of wellbore components, such as the casing 104 or the tubing 106. Cased hole tools may also measure rock and fluid properties through the casing 104.

Figure 3:
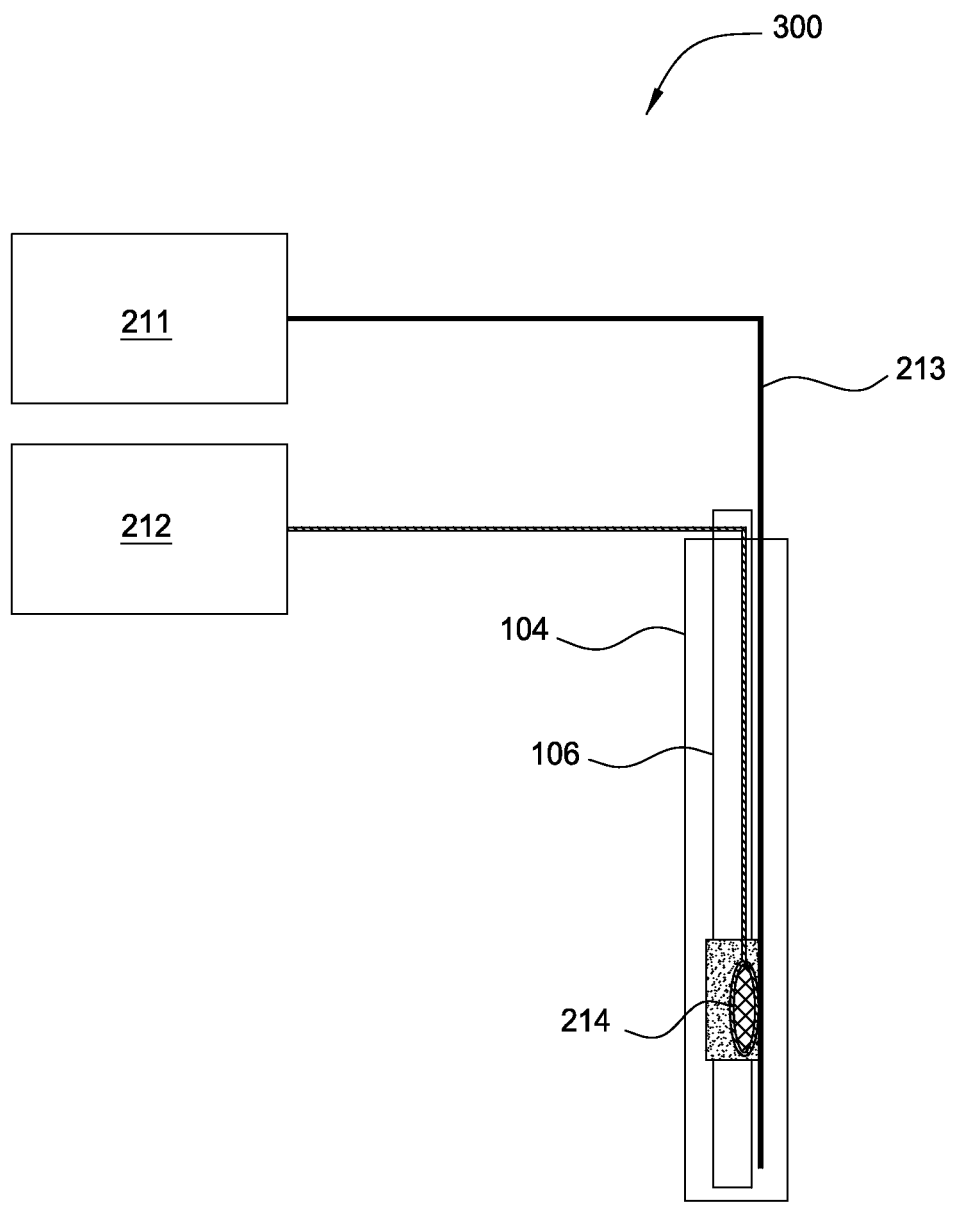
FIG. 3 illustrates a sonic well logging system, a portion of which may be permanently or semi-permanently emplaced, using an acoustic energy source and a DAS device both coupled to the outside of a tubing of a wellbore, according to an embodiment of the present invention.

The acoustic energy source 214 and the DAS device 213 may be located in the wellbore 102 according to various configurations, as shown in FIGS. 3-9. FIG. 3 illustrates an embodiment of a sonic well logging system 300, a portion of which may be permanently or semi-permanently emplaced for some embodiments, using an acoustic energy source 214 and a DAS device 213 both coupled to the outside of the tubing 106 of the wellbore 102. With this configuration, the acoustic energy source 214 and DAS device 213 may be conveyed downhole as the production tubing 106 is deployed.

Figure 4:
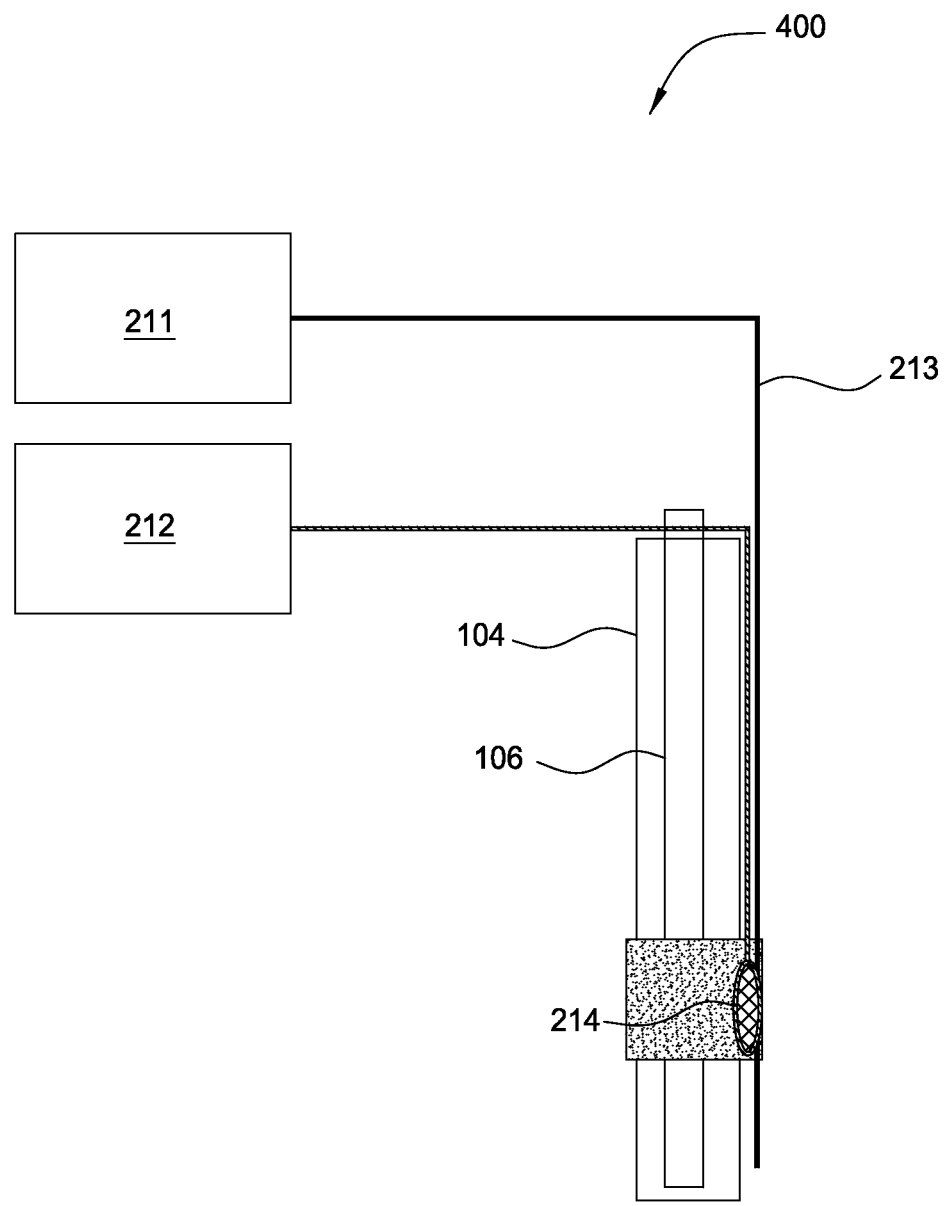
FIG. 4 illustrates a sonic well logging system, a portion of which may be permanently emplaced, using an acoustic energy source and a DAS device both disposed outside a casing of a wellbore, according to an embodiment of the present invention.

FIG. 4 illustrates an embodiment of a sonic well logging system 400, a portion of which may be permanently emplaced for some embodiments, using an acoustic energy source 214 and a DAS device 213 both disposed outside the casing 104 of the wellbore 102. The acoustic energy source 214 and DAS device 213 may be coupled to the outside of the casing 104 using any of various suitable means and may be conveyed downhole as the casing 104 is deployed. Once the casing 104 is deployed, the annulus between the borehole and the casing 104 may be filled with cement, thereby permanently fixing the source 214 and the DAS device 213 within the wellbore 102.

Figure 5:
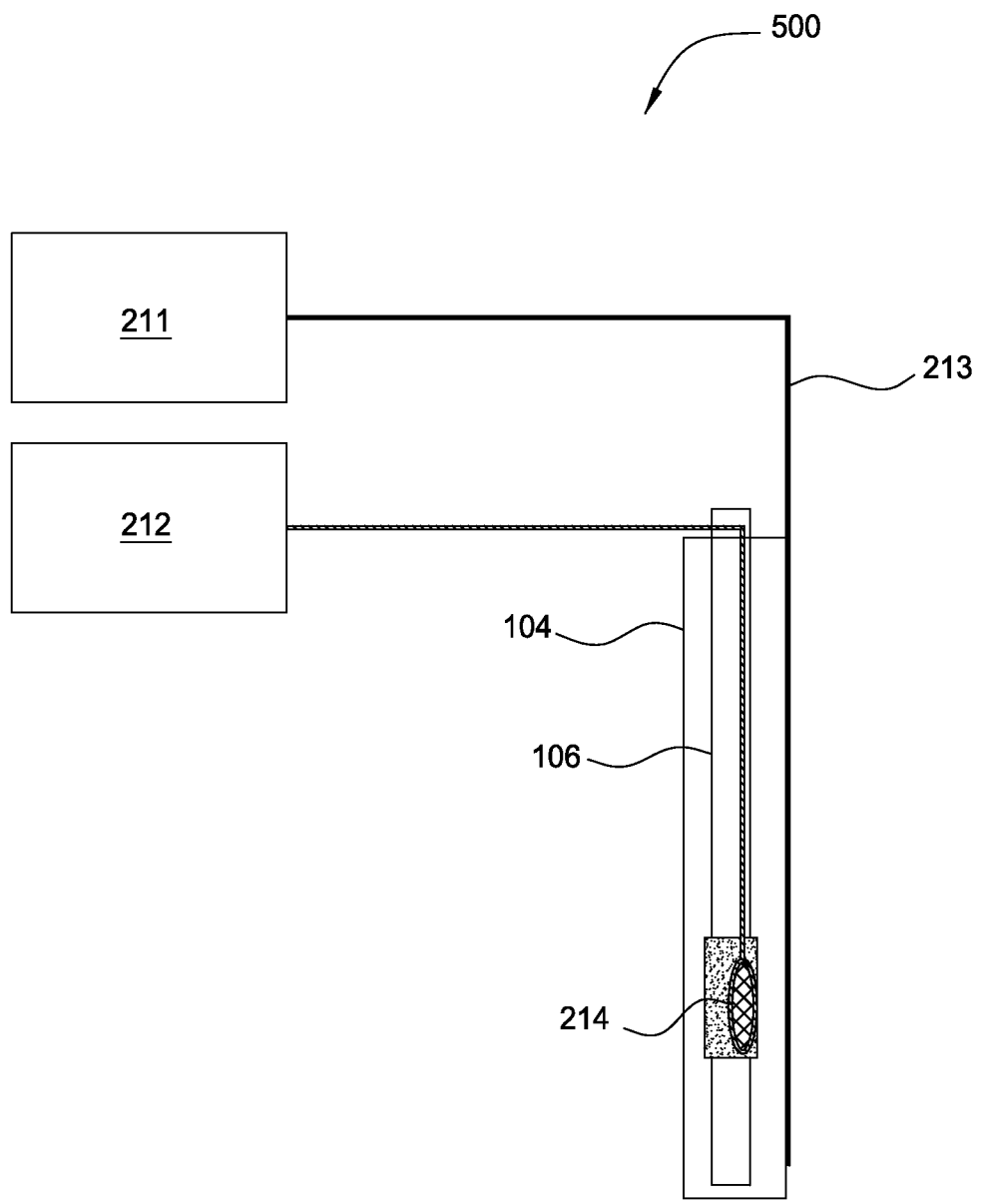
FIG. 5 illustrates a sonic well logging system, a portion of which may be permanently or semi-permanently emplaced, using an acoustic energy source coupled to the outside of a tubing of a wellbore and a DAS device disposed outside a casing of the wellbore, according to an embodiment of the present invention.

FIG. 5 illustrates an embodiment of a sonic well logging system 500, a portion of which may be permanently or semi-permanently emplaced for some embodiments, using an acoustic energy source 214 coupled to the outside of the tubing 106 of the wellbore 102 and a DAS device 213 disposed outside the casing 104 of the wellbore 102. The DAS device 213 may be disposed in a cable coupled to the casing 104 for some embodiments and conveyed downhole as the casing 104 is deployed in the wellbore 102. For other embodiments, the cable may be fed in the annulus between the borehole and the casing 104 after deployment of the casing 104 and before filling the annulus with cement. The acoustic energy source 214 may be conveyed downhole as the production tubing 106 is deployed, as described above.

Figure 6:
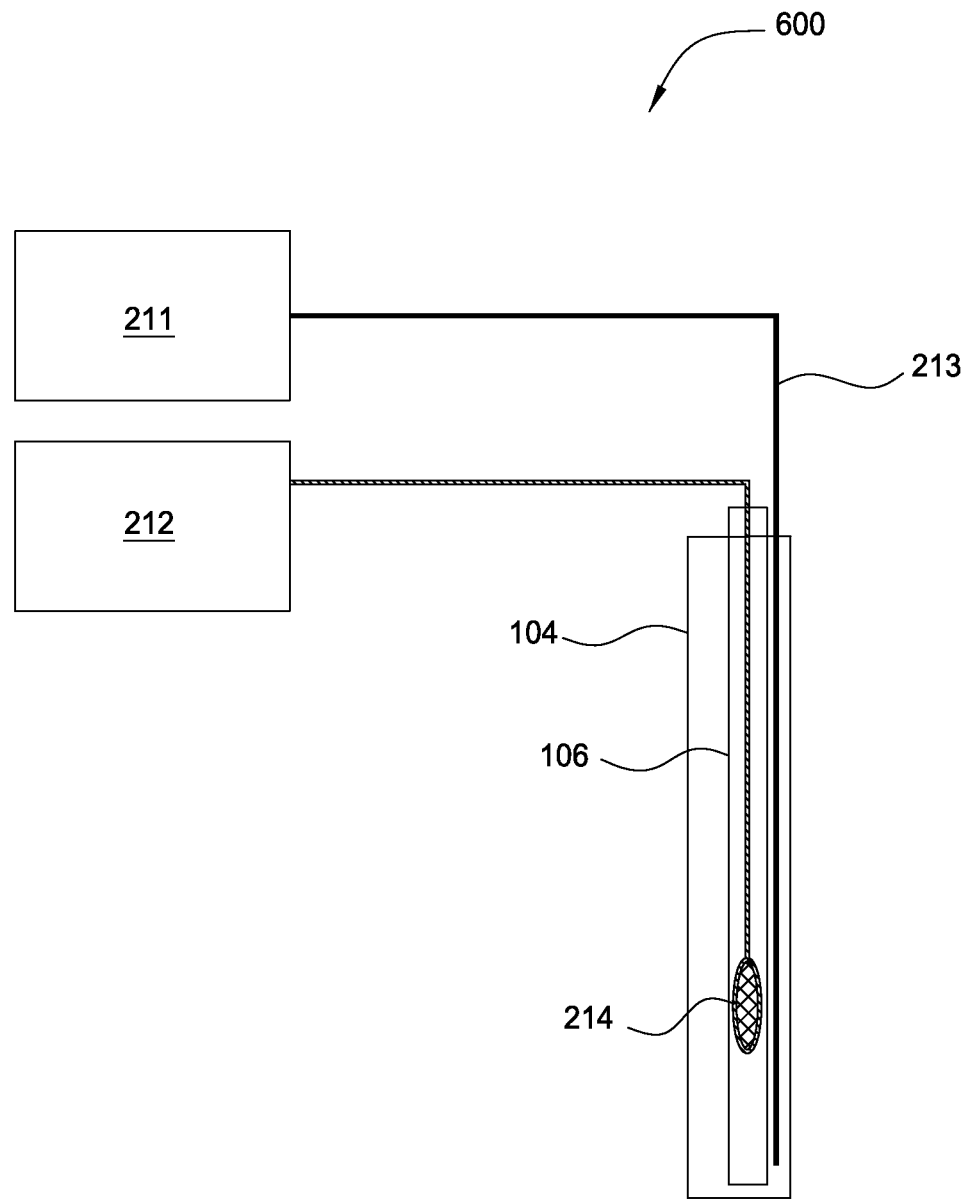
FIG. 6 illustrates a sonic well logging system, a portion of which may be permanently or semi-permanently emplaced, using a wireline-conveyed acoustic energy source and a DAS device coupled to the outside of a tubing of a wellbore, according to an embodiment of the present invention.

A sonic well logging system may also comprise a wireline-conveyed acoustic energy source. FIG. 6 illustrates an embodiment of a sonic well logging system 600, a portion of which may be permanently or semi-permanently emplaced for some embodiments, using a wireline-conveyed acoustic energy source 214 and a DAS device 213 coupled to the outside of the tubing 106 of the wellbore 102. The DAS device 213 may be disposed in a cable coupled to the tubing 106 for some embodiments and conveyed downhole as the tubing 106 is deployed in the wellbore 102. The acoustic energy source 214 may be removable and, thus, may not be permanently emplaced for some embodiments.

Figure 7:
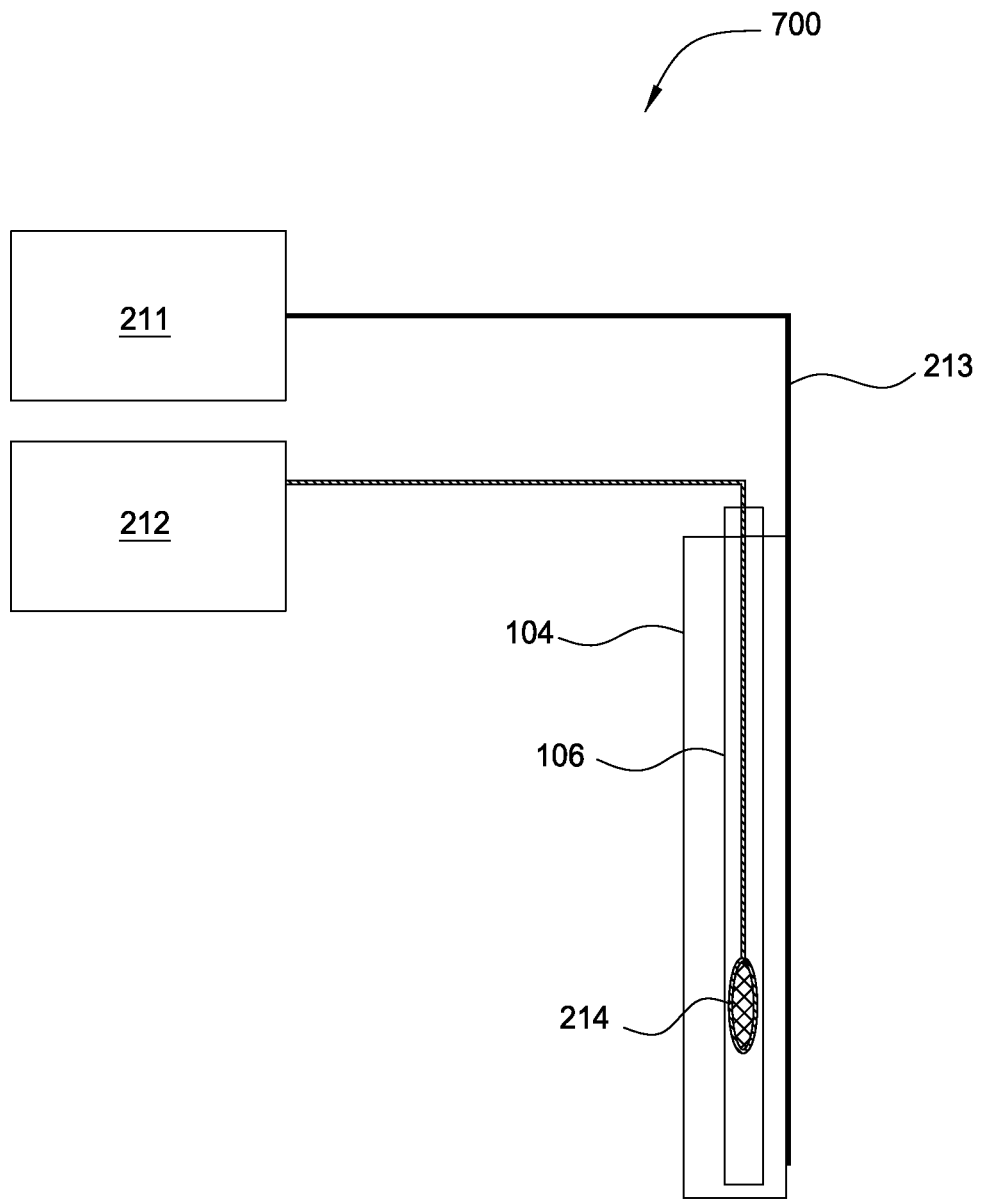
FIG. 7 illustrates a sonic well logging system, a portion of which may be permanently emplaced, using a wireline-conveyed acoustic energy source and a DAS device disposed outside a casing of a wellbore, according to an embodiment of the present invention.

FIG. 7 illustrates an embodiment of a sonic well logging system 700, a portion of which may be permanently emplaced for some embodiments, using a wireline-conveyed acoustic energy source 214 and a DAS device 213 disposed outside the casing 104 of the wellbore 102. The DAS device 213 may be disposed in a cable coupled to the casing 104 for some embodiments and conveyed downhole as the casing 104 is deployed in the wellbore 102. For other embodiments, the cable may be fed in the annulus between the borehole and the casing 104 after deployment of the casing 104 and before filling the annulus with cement. The acoustic energy source 214 may be removable and, thus, may not be permanently emplaced for some embodiments.

Figure 8:
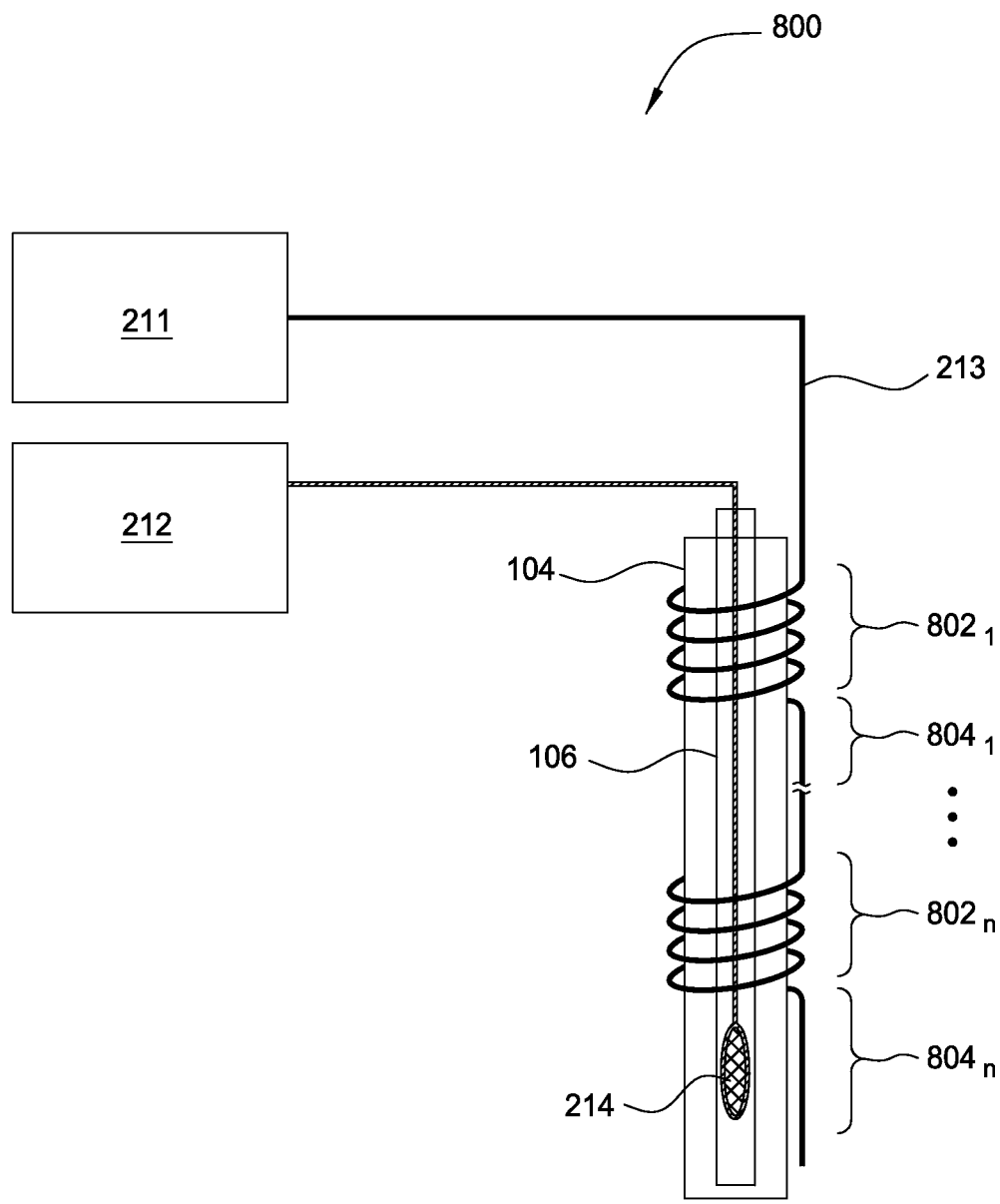
FIG. 8 illustrates a sonic well logging system, a portion of which may be permanently emplaced, using a wireline-conveyed acoustic energy source and a DAS device wrapped in a spiral manner outside a casing of a wellbore at certain casing locations, according to an embodiment of the present invention.

In further embodiments of the present invention, it may be desired to perform in-depth sonic well logging at discrete circumference areas or lengths along the wellbore 102. FIG. 8 illustrates an embodiment of a sonic well logging system 800 using a wireline-conveyed acoustic energy source 214 and a DAS device 213 wrapped in a spiral manner outside the casing 104 of the wellbore 102 for at least one length $802_1$ along the casing 104 to perform in-depth sonic well logging. Wrapping the DAS device 213 for the at least one length $802_1$ may allow more dense measurements to be made along the at least one length $802_1$, due to the increased number of functionally equivalent acoustic sensors, thereby increasing sensitivity in this region.

In other areas $804_1$ along the casing 104 where less dense, more typical sonic well logging may be performed, the DAS device 213 may run outside along the length of the casing 104 as in previous embodiments. There may be up to n areas wherein in-depth and more typical sonic well logging may be performed ($802_n$ and $804_n$). For other embodiments, the DAS device 213 may be spirally wrapped around the tubing 106 instead of the casing 104.

Figure 9:
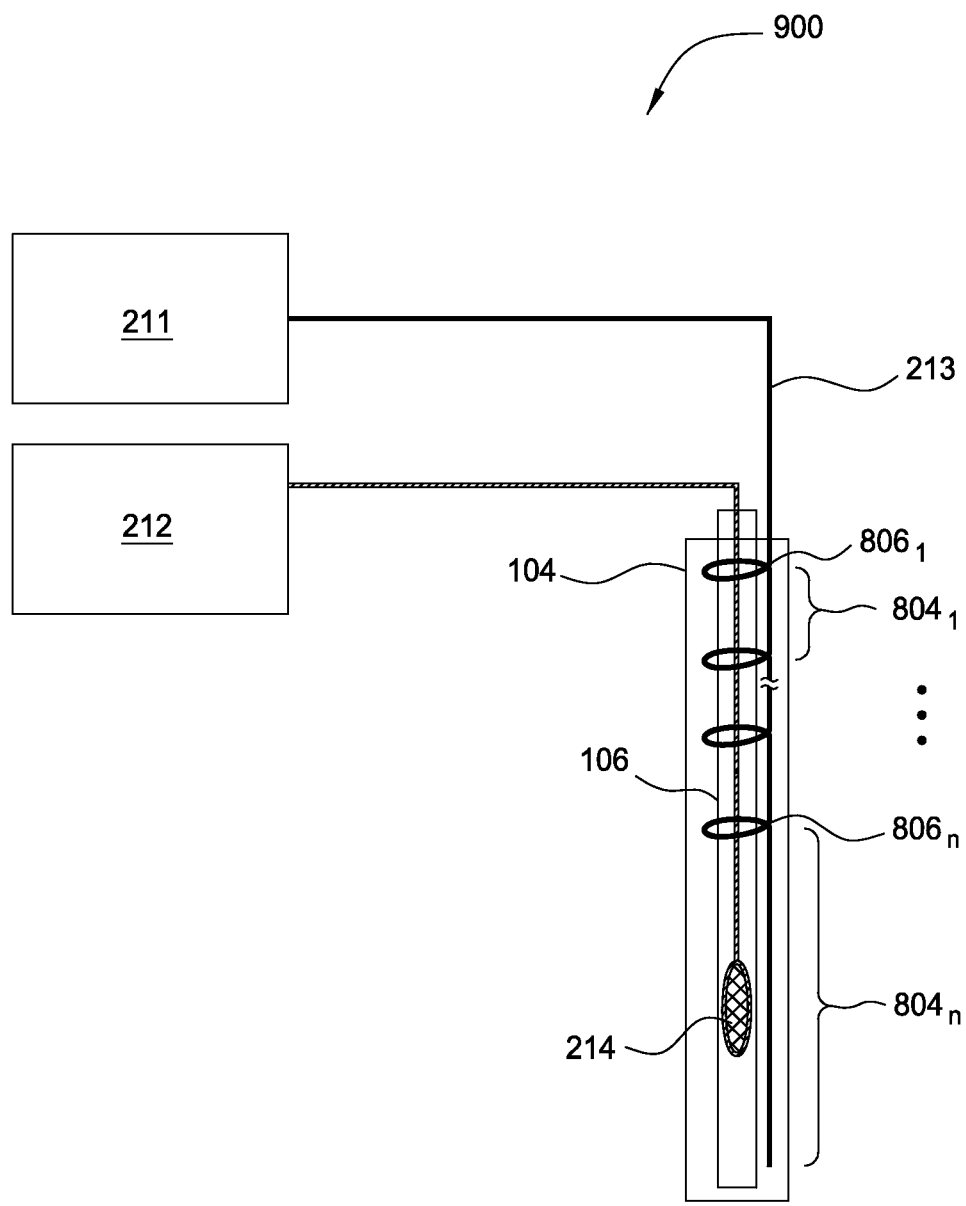
FIG. 9 illustrates a sonic well logging system, a portion of which may be permanently or semi-permanently emplaced, using a wireline-conveyed acoustic energy source and a DAS device wrapped around a tubing of a wellbore at certain tubing locations, according to an embodiment of the present invention.

FIG. 9 illustrates an embodiment of a sonic well logging system 900 using a wireline-conveyed acoustic energy source 214 and a DAS device 213 circularly wrapped around the tubing 106 of the wellbore 102 for at least one discrete circumference $806_1$ along the tubing 106 to perform in-depth sonic well logging. The discrete circumference $806_1$ may comprise one or more wrappings of the DAS device 213, wherein the wrappings may overlap one another.

In the other areas $804_1$ along the tubing 106 where less dense, more typical sonic well logging may be performed, the DAS device 213 may run outside along the length of the tubing 106 as in previous embodiments. There may be up to n areas wherein both in-depth and more typical sonic well logging may be performed ($806_n$ and $804_n$). For other embodiments, the DAS device 213 may be circularly wrapped around the casing 104 instead of the tubing 106. Some embodiments may have a combination of spiral and circular wrapping at different areas around the casing 104 or the tubing 106.

Figure 10:
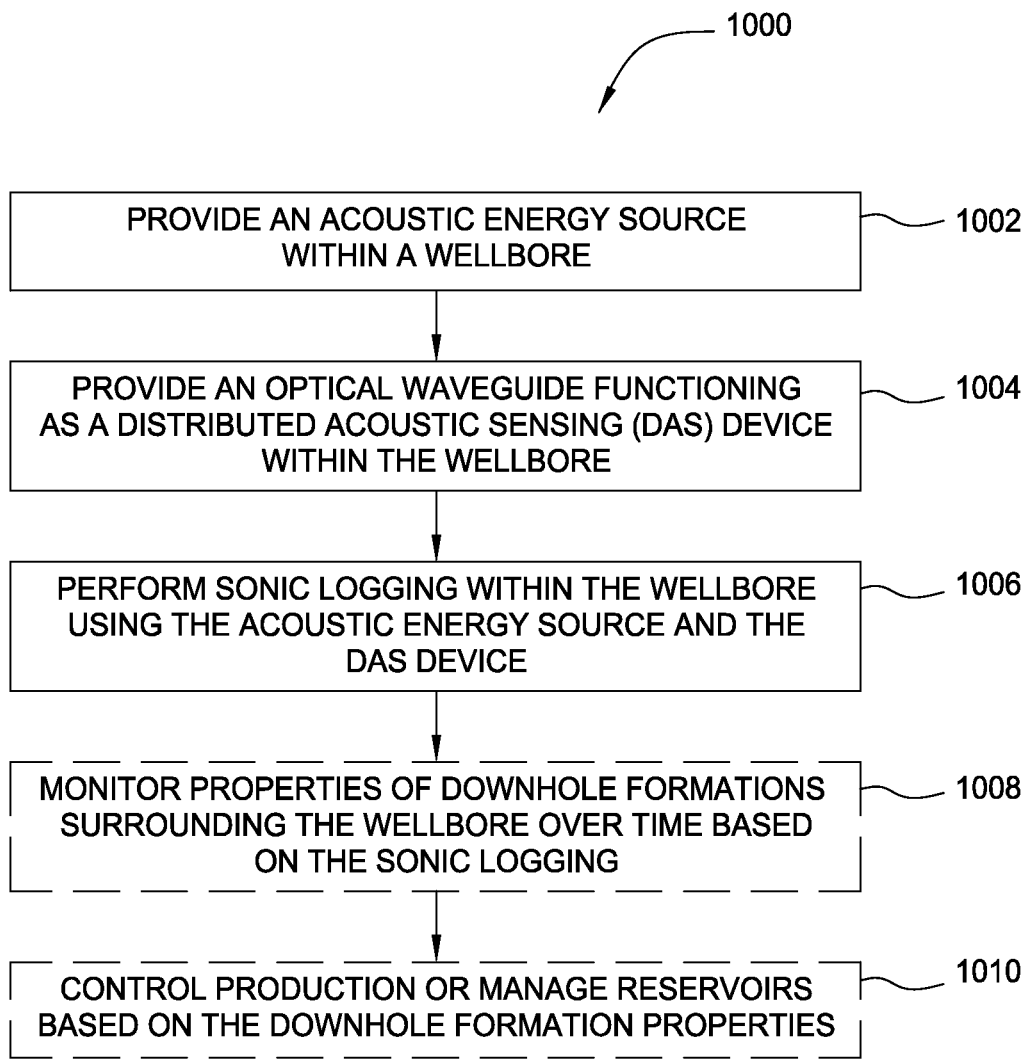
FIG. 10 is a flow diagram of exemplary operations for performing sonic well logging within a wellbore using an acoustic energy source and a DAS device, according to an embodiment of the present invention.

FIG. 10 illustrates operations 1000 for performing sonic well logging within the wellbore 102 using DAS. The operations may begin at 1002 by providing an acoustic energy source, such as acoustic energy source 214, within the wellbore 102. At 1004, an optical waveguide functioning as a DAS device, such as the DAS device 213, may be provided within the wellbore 102. At 1006, sonic well logging may be performed within the wellbore 102 using the acoustic energy source 214 and the DAS device 213. The DAS instrument 211 may measure disturbances in scattered light that may be propagated within the DAS device 213. The disturbances in the scattered light may be due to acoustic signals (generated by the acoustic energy source 214) reflecting from various downhole formations surrounding the wellbore 102, wherein the reflections may change the index of refraction or mechanically deform the DAS device 213.

Optionally, at 1008, properties of downhole formations surrounding or otherwise adjacent the wellbore 102 may be monitored over time based on the sonic well logging. Optionally, at 1010, hydrocarbon production may be controlled or reservoirs may be managed based on the downhole formation properties.

A sonic well logging system based on DAS may offer technical and deployment advantages over electronic or optical Bragg grating based systems for permanently deployed acoustic arrays. The DAS device 213 may be capable of producing the equivalent of tens, hundreds, or even thousands of acoustic sensors along the waveguide, and the permanent emplacement of the DAS device 213 may not be nearly as complex or expensive as emplacing an array of sensors comprising multiple discrete devices. Furthermore, multiplexing may be simpler, downhole electronics need not be used, and the DAS device 213 may be used in extreme, high temperature environments.

While the foregoing is directed to embodiments of the present invention, other and further embodiments of the invention may be devised without departing from the basic scope thereof, and the scope thereof is determined by the claims that follow.

What is claimed is:

1. An apparatus for performing sonic well logging in a wellbore, comprising:
   an acoustic energy source disposed between an outer surface of a borehole casing located in the wellbore and an inner surface of the wellbore, the acoustic energy source for generating acoustic signals in the wellbore, wherein the acoustic signals interact with the wellbore, a wellbore completion, or formations adjacent the wellbore to form transmitted, reflected, refracted, or absorbed acoustic signals; and
   an optical waveguide for distributed acoustic sensing (DAS) disposed between the outer surface of the borehole casing and the inner surface of the wellbore, wherein the transmitted, reflected, or refracted acoustic signals affect light propagating in the waveguide.

2. The apparatus of claim 1, wherein at least one of the acoustic energy source and the waveguide is permanently emplaced in the wellbore.

3. The apparatus of claim 1, wherein the acoustic energy source and the waveguide are suspended in a cable in the wellbore.

4. The apparatus of claim 1, wherein the waveguide is wrapped in a spiral manner around at least a portion of the borehole casing.

5. The apparatus of claim 1, wherein the waveguide is circularly wrapped around at least one circumference of the borehole casing.

6. The apparatus of claim 1, further comprising an acoustic energy source controller configured to control the acoustic energy source.

7. The apparatus of claim 1, further comprising a DAS instrument configured to introduce optical pulses into the waveguide and/or to sense disturbances in the optical pulses propagating in the waveguide.

8. The apparatus of claim 1, wherein the acoustic energy source comprises a wireline-conveyed acoustic energy source.

9. The apparatus of claim 1, wherein the acoustic energy source is removable.

10. A method comprising:
    providing an acoustic energy source disposed between an outer surface of a borehole casing located in a wellbore and an inner surface of the wellbore;
    providing an optical waveguide disposed between the outer surface of the borehole casing and the inner surface of the wellbore; and
    performing distributed acoustic sensing (DAS) in the wellbore using the acoustic energy source and the optical waveguide.

11. The method of claim 10, wherein the acoustic energy source is removable.

12. The method of claim 10, wherein the acoustic energy source comprises a wireline-conveyed acoustic energy source.

13. The method of claim 10, wherein performing DAS comprises generating acoustic signals using the acoustic energy source, wherein the acoustic signals interact with the wellbore, a wellbore completion, or formations adjacent the wellbore to form transmitted, reflected, refracted, or absorbed acoustic signals and wherein the transmitted, reflected, or refracted acoustic signals affect light propagating in the waveguide.

14. The method of claim 10, wherein performing DAS in the wellbore comprises performing sonic well logging.

15. The method of claim 14, further comprising monitoring properties of downhole formations adjacent the wellbore over time based on the sonic well logging.

16. The method of claim 15, further comprising controlling production or managing reservoirs based on the downhole formation properties.

17. The method of claim 10, wherein at least one of the acoustic energy source and the waveguide is semi-permanently emplaced in the wellbore.

18. The method of claim 10, wherein performing DAS comprises:
    introducing optical pulses into the waveguide; and
    sensing disturbances in the optical pulses propagating through the waveguide.

* * * * *